Figures 1, 2:
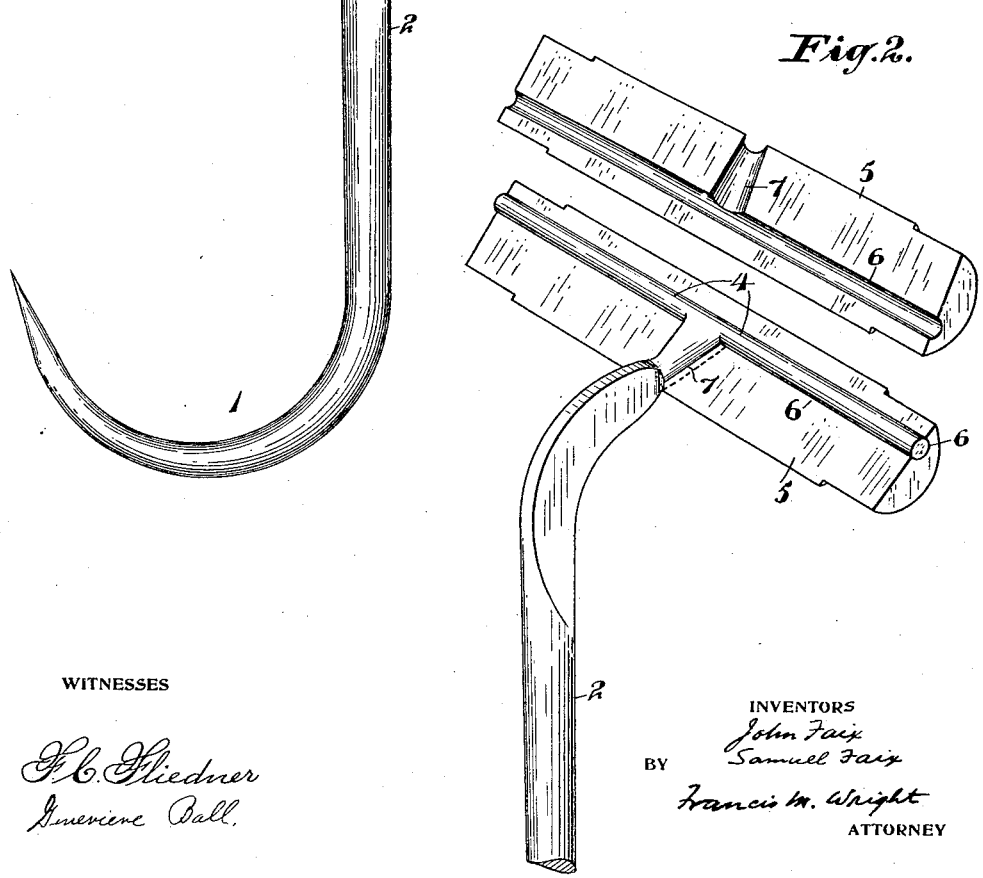

J. & S. FAIX.
BALE HOOK.
APPLICATION FILED FEB. 8, 1913.

1,111,370.

Patented Sept. 22, 1914.

WITNESSES
F. C. Fliedner
Genevieve Ball

INVENTORS
John Faix
Samuel Faix
BY Francis M. Wright
ATTORNEY

UNITED STATES PATENT OFFICE.

JOHN FAIX AND SAMUEL FAIX, OF SAN FRANCISCO, CALIFORNIA.

BALE-HOOK.

1,111,370.  Specification of Letters Patent.  Patented Sept. 22, 1914.

Application filed February 8, 1913.  Serial No. 747,060.

*To all whom it may concern:*

Be it known that we, JOHN FAIX and SAMUEL FAIX, subjects of the Emperor of Austria, residing at San Francisco, in the county of San Francisco and State of California, have invented new and useful Improvements in Bale-Hooks, of which the following is a specification.

The object of the present invention is to provide an improved hook for lifting or moving bales of hay or the like. Such hooks have heretofore been secured to the handle by their stem being passed wholly therethrough, and a washer, nut, or other similar device being secured upon the projecting end of the stem. When such a hook is used by the same person during the whole day, this projecting portion, by constant abrasion against the inner surface of the hand wears away the skin and makes a soft place which until healed prevents the user from further work with the hook. The object of our invention is to provide a hook so attached to the handle that this cannot occur.

In the accompanying drawing, Figure 1 is a perspective view of the hook; Fig. 2 is a broken similar view of the same the parts being detached.

Referring to the drawing, 1 indicates a hook having a stem 2. The end of the stem remote from the point of the hook is welded to the center of a cross-bar 4 of suitable metal.

The handle is formed in two precisely similar sections 5, each of the general form of a semi-cylinder and each formed with a longitudinal groove 6 in the flat side of the section to one side of its axis, said longitudinal groove being connected at the center with a short transverse groove 7 leading to the farther edge of the flat side of the section. The cross-bar 4 is laid in the longitudinal groove 6 of one section, the terminal portion of the stem 2 connected with said cross-bar being then laid in the short transverse groove 7 thereof, and the other handle section is then laid in contact with the first handle section so that the cross-bar is contained in both longitudinal grooves 6, as likewise the terminal portion of the stem in the transverse grooves 7. The handles are then secured together in any suitable manner, and are here shown as secured by means of rings 8 on their ends.

It is obvious that no portion of the hook projects from the handle except the side of the stem next the hook, which is contained between the fingers of a person grasping the handle.

We claim:—

A bale hook or the like comprising a hook proper having a stem, a metallic cross-bar secured to the end of the stem, handle sections each formed with a flat inner side and a rounded outer side and each having in the flat side on one side of the center a longitudinal groove in which the cross-bar is portionally contained and a transverse groove extending from the center of the longitudinal groove to the remote edge of the handle section, and means for securing said handle sections together.

In testimony whereof we have hereunto set our hands in the presence of two subscribing witnesses.

JOHN FAIX.
SAMUEL FAIX.

Witnesses:
FRANCIS M. WRIGHT,
D. B. RICHARD.